(12) United States Patent
LaPierre

(10) Patent No.: US 11,394,650 B2
(45) Date of Patent: Jul. 19, 2022

(54) MODIFICATIONLESS PACKET PRIORITIZATION FOR FRAME GENERATION

(71) Applicant: Charter Communications Operating, LLC, St. Louis, MO (US)

(72) Inventor: William M. LaPierre, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/848,469

(22) Filed: Apr. 14, 2020

(65) Prior Publication Data

US 2021/0320873 A1 Oct. 14, 2021

(51) Int. Cl.
| | |
|---|---|
| *H04L 47/2425* | (2022.01) |
| *H04L 12/46* | (2006.01) |
| *H04L 12/28* | (2006.01) |
| *H04L 47/2441* | (2022.01) |

(52) U.S. Cl.
CPC ...... *H04L 47/2433* (2013.01); *H04L 12/2801* (2013.01); *H04L 12/4633* (2013.01); *H04L 47/2441* (2013.01)

(58) Field of Classification Search
CPC ............. H04L 12/2801; H04L 12/4633; H04L 47/2433; H04L 47/2441
See application file for complete search history.

(56) References Cited

U.S. PATENT DOCUMENTS

| | | | | |
|---|---|---|---|---|
| 6,304,578 | B1* | 10/2001 | Fluss | H04L 12/2801 |
| | | | | 348/E7.063 |
| 6,442,158 | B1* | 8/2002 | Beser | H04L 12/2801 |
| | | | | 370/352 |
| 6,546,017 | B1* | 4/2003 | Khaunte | H04L 47/15 |
| | | | | 370/412 |
| 6,888,828 | B1 | 5/2005 | Partanen et al. | |
| 7,039,048 | B1* | 5/2006 | Monta | H04L 12/2801 |
| | | | | 370/389 |
| 7,184,427 | B1* | 2/2007 | Carew | H04L 12/2856 |
| | | | | 370/352 |
| 7,613,167 | B2 | 11/2009 | Denney et al. | |
| 7,639,617 | B2 | 12/2009 | Chapman et al. | |
| 7,688,828 | B2 | 3/2010 | Chapman et al. | |
| 7,773,594 | B2 | 8/2010 | Asati et al. | |

(Continued)

OTHER PUBLICATIONS

Non-Final Office Action for U.S. Appl. No. 16/848,511, dated Jul. 15, 2021, 15 pages.

(Continued)

*Primary Examiner* — Melanie Jagannathan
(74) *Attorney, Agent, or Firm* — Dority & Manning, P.A.

(57) ABSTRACT

Modification less packet prioritization for frame generation is disclosed. An aggregation device receives, via a digital communication interface, a plurality of encapsulated packets, each respective encapsulated packet of the plurality of encapsulated packets comprising a priority indicator and a packet to which the priority indicator corresponds. The aggregation device extracts a corresponding plurality of packets from the plurality of encapsulated packets and generates a frame that comprises a subset of packets selected from the plurality of packets based at least in part on the priority indicators that correspond to the plurality of packets. The aggregation device transmits the frame via a second communication interface.

18 Claims, 8 Drawing Sheets

(56) References Cited

U.S. PATENT DOCUMENTS

| | | |
|---|---|---|
| 7,881,199 B2 | 2/2011 | Krstulich |
| 7,970,010 B2 | 6/2011 | Denney et al. |
| 7,990,952 B2 | 8/2011 | Denney et al. |
| 8,127,055 B1* | 2/2012 | Clauberg .................. H04J 3/14 710/30 |
| 8,254,394 B1* | 8/2012 | Gummalla ................ H04L 5/00 370/395.43 |
| 8,279,892 B2 | 10/2012 | Denney et al. |
| 8,468,572 B2* | 6/2013 | Liu ..................... H04L 47/2416 725/94 |
| 8,599,842 B2 | 12/2013 | Asati et al. |
| 8,705,567 B2 | 4/2014 | Denney et al. |
| 8,711,878 B2 | 4/2014 | Denney et al. |
| 8,724,996 B2 | 5/2014 | You et al. |
| 8,908,716 B2 | 12/2014 | Denney et al. |
| 8,923,131 B2 | 12/2014 | Danzig et al. |
| 9,065,741 B1* | 6/2015 | Varanasi ............. H04L 63/0485 |
| 9,100,206 B1* | 8/2015 | Barth .................. H04L 45/308 |
| 9,391,906 B2* | 7/2016 | Kamble .................. H04L 69/22 |
| 9,479,444 B2 | 10/2016 | Danzig et al. |
| 9,794,143 B1* | 10/2017 | Chari .................. H04L 43/08 |
| 10,003,541 B2 | 6/2018 | Adams et al. |
| 10,462,502 B2* | 10/2019 | Tsukagoshi ............. H04L 1/0009 |
| 10,567,293 B1* | 2/2020 | Pularikkal ............. H04L 45/306 |
| 10,594,604 B1* | 3/2020 | Lohiya .................... H04L 45/74 |
| 10,785,058 B2 | 9/2020 | Lee et al. |
| 2002/0010866 A1* | 1/2002 | McCullough ......... H04L 63/164 726/3 |
| 2002/0133618 A1* | 9/2002 | Desai .................. H04L 12/2874 709/238 |
| 2004/0264472 A1* | 12/2004 | Oliver ..................... H04L 47/10 370/395.4 |
| 2004/0267948 A1* | 12/2004 | Oliver ................ H04L 47/6225 709/230 |
| 2007/0097907 A1* | 5/2007 | Cummings ......... H04L 12/2863 370/329 |
| 2008/0253299 A1* | 10/2008 | Damm .................... H04L 43/50 370/252 |
| 2009/0040930 A1* | 2/2009 | Yonge, III .............. H04L 45/12 370/235 |
| 2009/0252148 A1* | 10/2009 | Dolganow .......... H04L 67/2819 370/351 |
| 2010/0061235 A1* | 3/2010 | Pai ......................... H04L 47/10 370/230.1 |
| 2010/0093359 A1* | 4/2010 | Gallagher ............. H04W 16/32 455/445 |
| 2010/0232325 A1* | 9/2010 | Weber ..................... H04L 27/34 370/297 |
| 2010/0246582 A1* | 9/2010 | Salinger ............. H04L 12/2801 370/392 |
| 2011/0110266 A1* | 5/2011 | Li .......................... H04W 56/00 370/253 |
| 2011/0145911 A1* | 6/2011 | O'Brien ............. H04L 63/0227 726/13 |
| 2012/0243410 A1* | 9/2012 | Vedula ................ H04L 41/5025 370/235 |
| 2012/0275792 A1* | 11/2012 | Nandiraju ........... H04J 14/0257 398/66 |
| 2012/0307147 A1* | 12/2012 | Kondareddy .......... H04L 69/32 348/E5.009 |
| 2013/0322465 A1* | 12/2013 | Way ........................ H04L 47/36 370/474 |
| 2014/0036722 A1* | 2/2014 | Giloh .................. H04L 12/4633 370/254 |
| 2014/0181319 A1* | 6/2014 | Chen ....................... H04L 69/12 709/234 |
| 2014/0226663 A1* | 8/2014 | Chan .................... H04L 47/624 370/392 |
| 2015/0043350 A1* | 2/2015 | Basilier .................. H04L 47/24 370/235 |
| 2015/0063158 A1* | 3/2015 | Nedeltchev ........... H04W 24/08 370/253 |
| 2015/0092531 A1* | 4/2015 | Bernstein ............ H04L 41/0816 370/216 |
| 2015/0341271 A1* | 11/2015 | Cortes Gomez ........ H04L 47/11 370/236 |
| 2016/0315864 A1* | 10/2016 | Tan ..................... H04L 41/0823 |
| 2017/0005920 A1* | 1/2017 | Previdi ................. H04L 45/507 |
| 2017/0332282 A1* | 11/2017 | Dao ..................... H04L 1/0026 |
| 2017/0359268 A1* | 12/2017 | Chan ..................... H04L 1/08 |
| 2017/0366374 A1* | 12/2017 | Osuga .................... H04L 47/14 |
| 2018/0097722 A1* | 4/2018 | Callard ................. H04L 45/38 |
| 2018/0191642 A1* | 7/2018 | Biederman ......... H04L 49/9005 |
| 2018/0192327 A1* | 7/2018 | Gaydos ................. H04W 28/08 |
| 2019/0394066 A1* | 12/2019 | Lin ....................... H04L 45/28 |
| 2021/0007039 A1* | 1/2021 | Salahuddeen ......... H04W 72/04 |
| 2021/0067414 A1* | 3/2021 | Costa ................. H04L 43/0876 |
| 2021/0160187 A1* | 5/2021 | Mitra .................... H04L 69/22 |

OTHER PUBLICATIONS

Notice of Allowance for U.S. Appl. No. 16/848,511, dated Nov. 15, 2021, 10 pages.

* cited by examiner

MODIFICATIONLESS PACKET PRIORITIZATION FOR FRAME GENERATION

RELATED APPLICATION

This application is related to "PACKET PRIORITIZATION FOR FRAME GENERATION," filed on even date herewith and having the same named inventor, the disclosure of which is hereby incorporated herein by reference in its entirety.

BACKGROUND

Data is often communicated between a service provider's network and equipment in a subscriber's residential or enterprise network via a frame-based radio frequency communications link. Frames of packets are assembled in the service provider's network and then communicated to one or more subscriber networks for packet extraction.

SUMMARY

The embodiments disclosed herein implement, among other features, modification less packet prioritization for frame generation. A radio frequency (RF) packet scheduler receives encapsulated packets, each of which includes an unmodified packet and a priority indicator that is indicative of a priority of the unmodified packet. The RF packet scheduler generates frames of packets based on the priority indicators that correspond to the packets. The RF packet scheduler transmits the frame via an RF communication interface to one or more subscribers.

In one embodiment a method is provided. The method includes receiving, by an aggregation device, via a digital communication interface, a plurality of encapsulated packets, each respective encapsulated packet of the plurality of encapsulated packets comprising a priority indicator and a packet to which the priority indicator corresponds. The method further includes extracting a corresponding plurality of packets from the plurality of encapsulated packets. The method further includes generating a frame that comprises a subset of packets selected from the plurality of packets based at least in part on the priority indicators that correspond to the plurality of packets, and transmitting the frame via a second communication interface.

In another embodiment an aggregation device is provided. The aggregation device includes a memory and a processor device coupled to the memory. The processor device is configured to receive, via a digital communication interface, a plurality of encapsulated packets, each respective encapsulated packet of the plurality of encapsulated packets comprising a priority indicator and a packet to which the priority indicator corresponds. The processor device is further configured to extract a corresponding plurality of packets from the plurality of encapsulated packets. The processor device is further configured to generate a frame that comprises a subset of packets selected from the plurality of packets based at least in part on the priority indicators that correspond to the plurality of packets, and transmit the frame via a second communication interface.

In another embodiment a computer program product stored on a non-transitory computer-readable storage medium is provided. The computer program product includes instructions configured to cause a processor device to receive, via a digital communication interface, a plurality of encapsulated packets, each respective encapsulated packet of the plurality of encapsulated packets comprising a priority indicator and a packet to which the priority indicator corresponds. The instructions are further configured to cause the processor device to extract a corresponding plurality of packets from the plurality of encapsulated packets. The instructions are further configured to cause the processor to generate a frame that comprises a subset of packets selected from the plurality of packets based at least in part on the priority indicators that correspond to the plurality of packets, and transmit the frame via a second communication interface.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
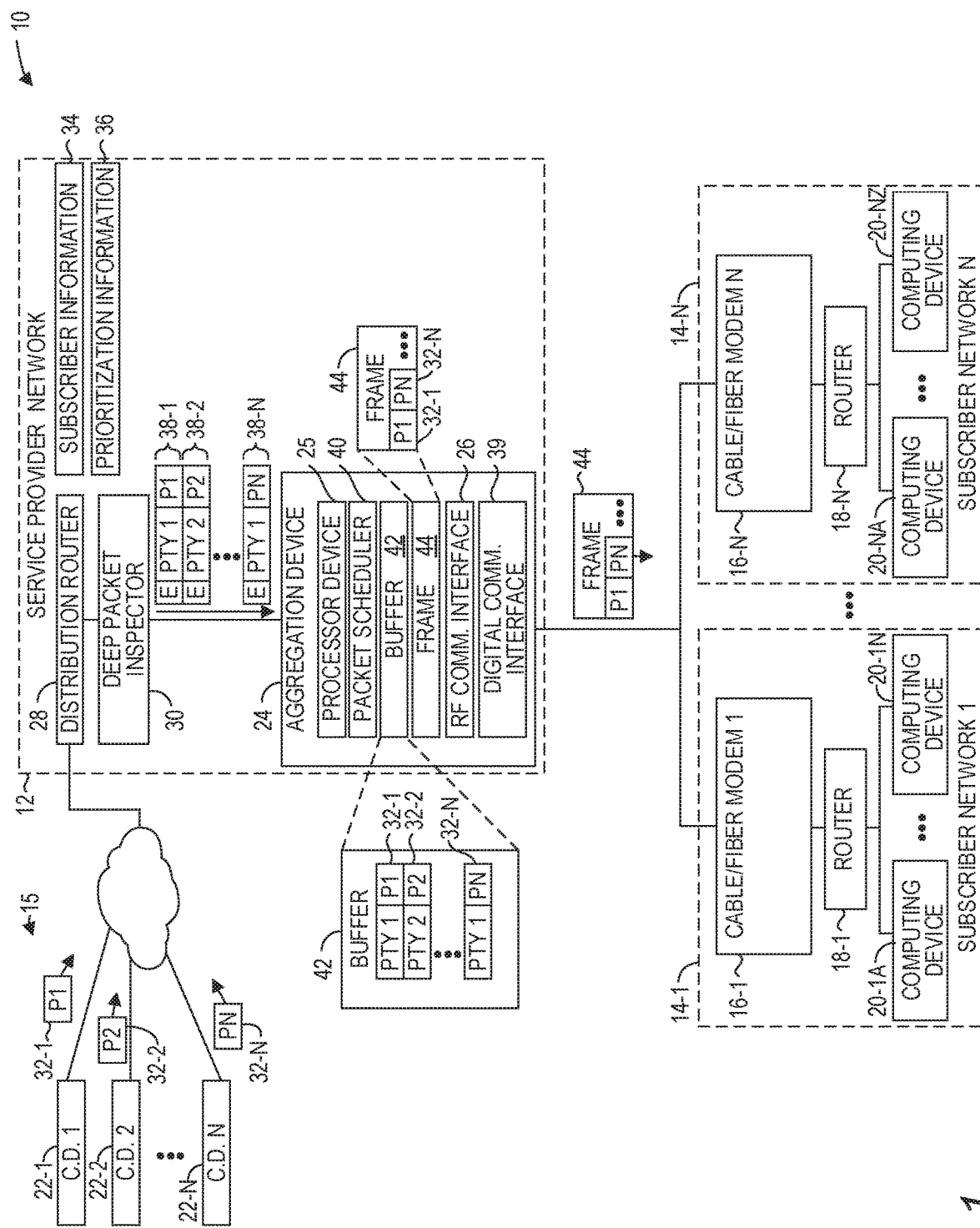
FIG. 1 is a block diagram of a system in which embodiments may be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Data is often communicated between a service provider's network and equipment in a subscriber's residential or enterprise network via a frame-based radio frequency (RF) communications link. Frames of packets are assembled in the service provider's network and then communicated to one or more subscriber networks for packet extraction.

An RF packet scheduler builds frames from packets received from multiple external sources. Such packets may be encrypted, and/or may be using the same protocol for different types of traffic. The RF packet scheduler knows the destination of the packets based on header information in each packet, but can only prioritize packets based on header information.

While an RF packet scheduler may utilize such header information to prioritize packets, such prioritization is generally inaccurate. Certain types of packets may be more latency sensitive than others, and, under times of heavy usage, increased latency of such packets may result in undesirable subscriber experiences.

For example, increased latency of voice over internet protocol (VOIP) packets may result in disruptive real-time communications for a subscriber. Alternatively, a video streaming service that sends video packets that are buffered at the recipient's device may be very tolerant to latency. As another example, a downloading web page using web protocols may be relatively intolerant to latency, while a download of a file using the same web protocols may be very tolerant to latency.

The embodiments disclosed herein implement, among other features, modificationless packet prioritization for frame generation. The embodiments include a deep packet inspector that inspects packets originating from multiple different computing devices, inspects the contents of the packets and, based on one or more criteria, determines a packet priority for each packet. The deep packet inspector encapsulates the packet with a priority indicator in a manner that does not modify the original contents of the packet. The deep packet inspector transmits the encapsulated packet to an RF packet scheduler. The RF packet scheduler extracts the packets from the encapsulated packets and generates frames of packets based on the priority indicators that correspond to the packets. The RF packet scheduler transmits the frame via an RF communication interface to one or more subscribers. In this manner, latency and other undesirable transmission issues are minimized. Because the packets themselves have not been modified, the recipients of such packets need not be aware of the prioritization mechanism and need not be modified to accommodate the prioritization mechanism.

FIG. 1 is a block diagram of a system 10 in which embodiments may be practiced. The system 10 includes a service provider network 12 that provides service to a plurality of subscriber networks 14-1-14-N (generally, subscriber networks 14). The subscriber networks 14 may include residences, businesses, or other entities. The service provider network 12 provides the subscriber networks 14 certain services, including, for example, the ability to communicate with the Internet 15 and with one another.

At a general level, each of the subscriber networks 14 may be similarly configured. As an example, the subscriber network 14-1 includes a modulator demodulator (modem) 16-1 that communicates with the service provider network via one interface, such as, by way of non-limiting example, an RF communication interface, and with a router 18-1 via a second interface, such as a digital interface. The term "RF communication interface" refers to a communication interface that receives and transmits modulated signals generated via modulation of a radio frequency signal, such as, by way non-limiting example, quadrature amplitude modulation. The term "digital communication interface" refers to a communication interface that receives and transmits data via two levels of signals, one of which corresponds to a value of 1 and one of which corresponds to a value of 0. The router 18-1 may be integral with the modem 16-1, or, as illustrated in FIG. 1, be external to the modem 16-1. The router 18-1 communicates with a plurality of computing devices 20-1A-20-1N via one or more packet-based communication technologies, such as Ethernet and/or Wi-Fi®. The subscriber network 14-N is similarly configured, and includes a modulator demodulator (modem) 16-N that communicates with the service provider network, via one interface, and with a router 18-N via a second interface. The router 18-N communicates with a plurality of computing devices 20-NA-20-NZ.

The service provider network 12 facilitates communications between the subscriber networks 14 and a plurality of computing devices 22-1-22-N that are external to the service provider network 12. The computing devices 22-1-22-N may provide any number and variety of services to the subscriber networks 14, such as, by way of non-limiting example, audio services, video services, telecommunication services, banking services, financial services, and the like.

The service provider network 12 includes an aggregation device 24 that is communicatively coupled to the subscriber networks 14. The aggregation device 24 includes a processor device 25. The aggregation device 24 processes all data sent from a subscriber network 14 that has a destination outside of the respective subscriber network 14, and processes all data originating outside of a respective subscriber network 14 that is destined for the respective subscriber network 14. The aggregation device 24 communicates with the subscriber networks 14 via a communication interface, such as, by way of non-limiting example, an RF communication interface 26. The aggregation device 24 and the subscriber networks 14 communicate using a frame-based protocol, such as, by way of non-limiting example, a Data Over Cable Service Interface Specification (DOCSIS) frame-based protocol, although the embodiments are not limited to any particular frame-based protocol. While the embodiments are described herein generally in the context of an aggregation device that comprises a cable modem termination system, the embodiments are not limited to any particular type of aggregation device, and apply, by way of non-limiting example, to satellite modem termination systems and the like.

The service provider network 12 includes a distribution router 28 that communicates with the aggregation device 24 and with devices external to the service provider network 12, such as the computing devices 22-1-22-N. The distribution router 28 includes, or is communicatively coupled to, a deep packet inspector 30. The deep packet inspector 30 is configured to receive a plurality of packets 32-1-32-N (generally, packets 32) from the plurality of computing devices 22-1-22-N, via the distribution router 28. The packets 32-1-32-N are destined for computing devices in the subscriber networks 14. The deep packet inspector 30 may receive hundreds, thousands, or even more packets each second. For each respective packet 32, the deep packet inspector 30 inspects the contents of the respective packet 32. The contents may include a header portion of the respective packet 32, and a payload portion of the respective packet 32. The header portion of a packet 32 contains metadata, such as source IP address, source port number, a protocol identifier, a destination IP address, a destination port number, and other information, such as Explicit Congestion Notification (ECN), Differentiated Services Code Point (DSCP), and Type of Service (ToS) information, depending on the particular protocol used. The payload portion of a packet 32 contains the substantive data utilized by a computing device in the subscriber networks 14, such as voice data, audio data, textual date, image data, and the like. The deep packet inspector 30 may, for a particular packet 32, inspect the header portion, the payload portion, or both portions. Based on the inspection, the deep packet inspector 30 determines a packet priority for the respective packet 32.

The packet priority may be based on any desired criteria, and may be system dependent. As an example, the deep packet inspector 30 may access subscriber information 34 and determine, for a respective packet 32, with which subscriber the respective packet 32 is associated. The particular subscriber may be identifiable, for example, based on the destination IP address of the packet 32, or based on other information contained in the packet 32. The subscriber information 34 may identify different subscriber priorities for different subscribers. For example, some subscribers may subscribe for service from the service provider via a high-priority subscription, while other subscribers may subscribe via lower priority subscriptions. The deep packet inspector 30 may determine the packet priority for the packet 32 based, at least in part, on such subscriber priority.

As another example, the deep packet inspector 30 may determine a packet type for a respective packet 32. The packet types may be categorized in any desired manner. As an example, the deep packet inspector 30 may determine that a respective packet 32 is a voice data packet type, an audio data packet type, a video data packet type, an image data packet type, a virtual reality imagery packet type, or the like. The deep packet inspector 30 may access prioritization information 36 that identifies different packet type priorities for different packet types, and determine the packet priority for the packet 32 based, at least in part, on such packet type priority. In some embodiments, the deep packet inspector 30 may utilize multiple criteria, such as both the subscriber priority and the packet type priority, and may utilize weights to give some criteria more importance than other criteria, to determine the packet priority. In some embodiments, different types of packets in the same packet flow may be prioritized differently based on the content of the different packets.

The deep packet inspector 30 generates encapsulated packets 38-1-38-N that includes the packets 32-1-32-N, respectively, and a priority indicator indicative of the packet priority for the respective packets 32-1-32-N. Note that the packets 32-1-32-N are unaltered in any manner. The term "encapsulated packet" as used herein refers to a packet that includes an original, unaltered packet, and additional information, such as a priority indicator. An encapsulated packet may be generated by a conventional protocol, such as a Virtual Local Area Network (VLAN) protocol, a Virtual Extensible Local Area Network (VXLAN) protocol, or by a custom protocol, and the generation of an encapsulated packet encompasses the act of tagging an unaltered packet with information. The deep packet inspector 30 transmits the encapsulated packets 38-1-38-N to the aggregation device 24. Note that there may be one or more intermediate devices, such as routers and/or switches, between the deep packet inspector 30 and the aggregation device 24. In some embodiments, the deep packet inspector 30 may be a component of the aggregation device 24. It should be noted that the process described above with regard to the deep packet inspector 30 is an ongoing, continuous process as the deep packet inspector 30 receives additional packets 32.

The aggregation device 24 receives the encapsulated packets 38-1-38-N via a digital communication interface 39. The digital communication interface 39 may comprise, for example, a digital Ethernet communication interface or any other suitable communication interface for communicating digitized data. The aggregation device 24 includes a packet scheduler 40 that extracts the packets 32-1-32-N from the corresponding encapsulated packets 38-1-38-N. In some embodiments, the packet scheduler 40 may store the packets 32-1-32-N in a buffer 42, along with the corresponding priority indicator of each such packets 32-1-32-N. The buffer 42 may comprise hundreds or thousands of packets that remain to be delivered to the subscriber networks 14-1-14-N. The packet scheduler 40 generates a frame 44 that comprises a subset of the packets 32 in the buffer 42 based at least in part on the priority indicators that correspond to the packets 32. The frame 44, in some embodiments, is a fixed size frame, and thus the packet scheduler 40 may utilize a number of criteria to select the subset of packets 32, including, by way of non-limiting example, the priority indicators, the size of the packets 32, the length of time the packets 32 have been idle in the buffer 42, and the like. The packet scheduler 40 may then delete the selected packets 32 from the buffer 42. Note that the frame 44 contains no priority indicators that correspond to the selected packets 32. In some embodiments, the frame 44 is generated in accordance with a particular frame-based protocol, such as, by way of non-limiting example, the DOCSIS frame-based protocol.

The packet scheduler 40 transmits the frame 44 via the RF communication interface 26 to the modems 16-1-16-N of the subscriber networks 14-1-14-N. Note that the packets 32 in the frame 44 may be destined for different subscriber networks 14-1-14-N. For example, the packet 32-1 may be destined for the subscriber network 14-1, and the packet 32-N may be destined for the subscriber network 14-N. The RF communication interface 26 may be coupled to a shared transmission medium, such as a coaxial cable, that is shared among the subscriber networks 14-1-14-N. In some embodiments, the aggregation device 24 comprises a cable modem termination system (CMTS).

The modems 16-1-16-N receive the frame 44, extract from the frame 44 the packets 32 designated for each respective subscriber network 14-1-14-N, and communicate the packets 32 to the corresponding routers 18-1-18-N for delivery to the appropriate destination computing devices 20. In this manner, the aggregation device 24 can prioritize frame-based packet delivery to multiple subscriber networks 14-1-14-N in a manner that is transparent to the multiple subscriber networks 14-1-14-N because the packets 32 themselves are not modified.

It is noted that because the packet scheduler 40 is a component of the aggregation device 24, functionality implemented by the packet scheduler 40 may be attributed to the aggregation device 24 generally. Moreover, in examples where the packet scheduler 40 comprises software instructions that program the processor device 25 to carry out functionality discussed herein, functionality implemented by the packet scheduler 40 may be attributed herein to the processor device 25.

Figure 2:
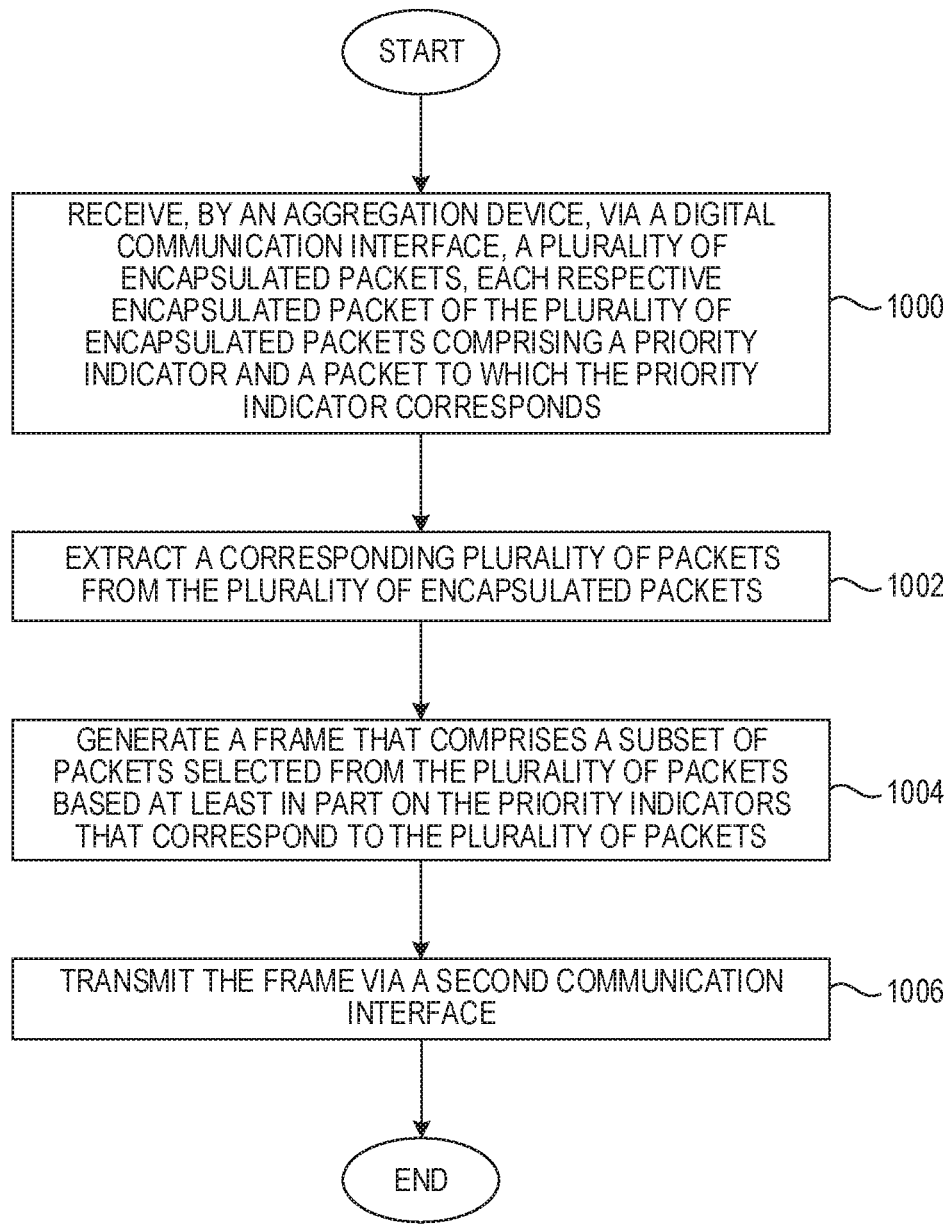
FIG. 2 is a flowchart of a method for modificationless packet prioritization for frame generation according to one embodiment.

FIG. 2 is a flowchart of a method for modificationless packet prioritization for frame generation according to one embodiment. FIG. 2 will be discussed in conjunction with FIG. 1. The aggregation device 24, via the digital communication interface 39, receives the plurality of encapsulated packets 38-1-38-N, each respective encapsulated packet 38-1-38-N of the plurality of encapsulated packets 38-1-38-N comprising a priority indicator and a packet 32-1-32-N to which the priority indicator corresponds (FIG. 2, block 1000). The aggregation device 24 extracts the corresponding plurality of packets 32-1-32-N from the plurality of encapsulated packets 38-1-38-N (FIG. 2, block 1002). The aggregation device 24 generates the frame 44 that comprises the subset of packets 32 selected from the plurality of packets 32-1-32-N based at least in part on the priority indicators that correspond to the plurality of packets 32-1-32-N (FIG. 2, block 1004). The aggregation device 24 transmits the frame 44 via the RF communication interface 26 (FIG. 2, block 1006).

Figure 3:
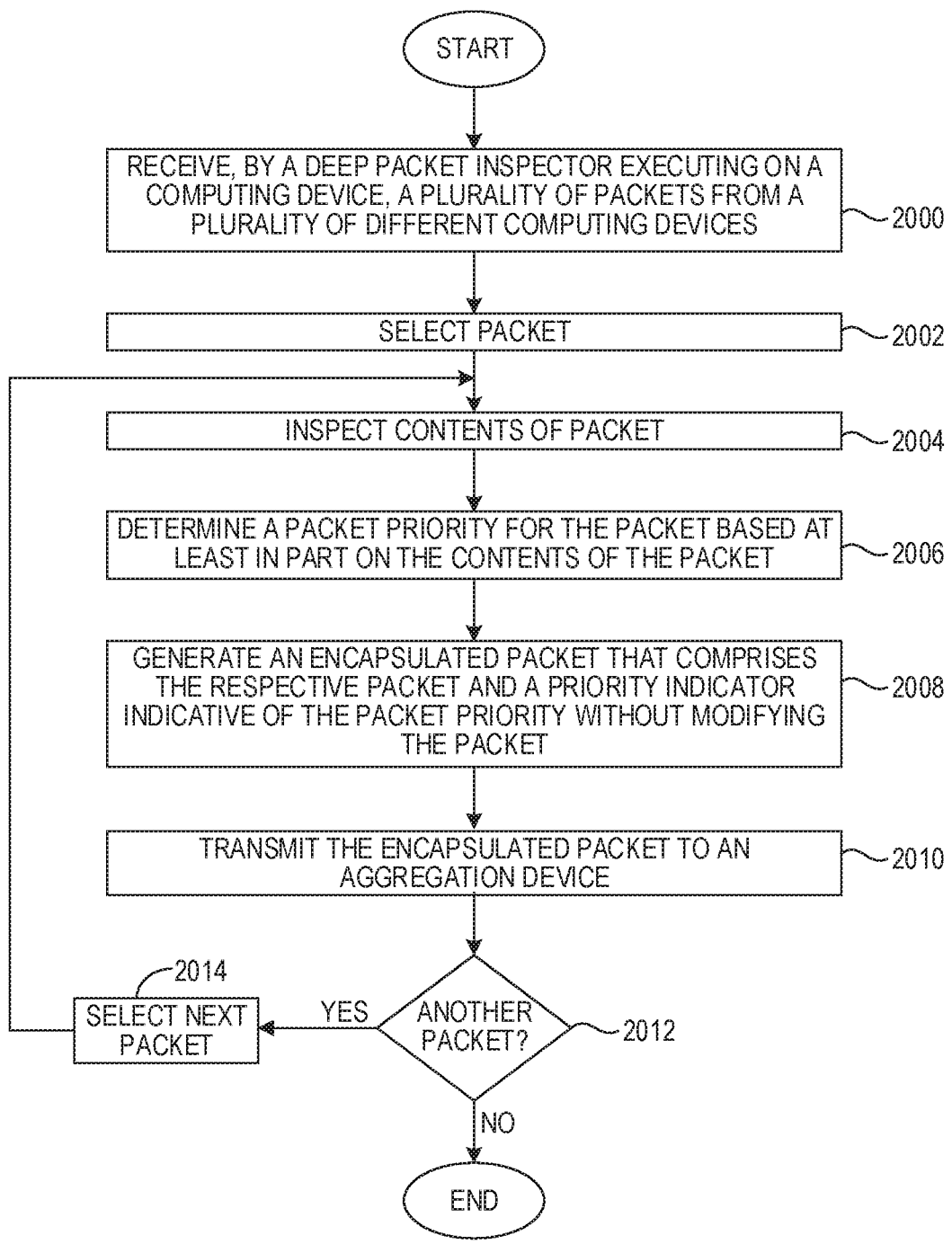
FIG. 3 is a flowchart of a method for modificationless packet prioritization for frame generation according to another embodiment.

FIG. 3 is a flowchart of a method for modificationless packet prioritization for frame generation according to another embodiment. FIG. 3 will be discussed in conjunction with FIG. 1. The deep packet inspector 30 receives the plurality of packets 32-1-32-N from the plurality of different computing devices 22-1-22-N via the distribution router 28 (FIG. 3, block 2000). The deep packet inspector 30 selects a first packet 32, such as the packet 32-1 for example, for inspection (FIG. 3, block 2002). The deep packet inspector 30 inspects the contents of the first packet 32-1 (FIG. 3, block 2004). The deep packet inspector 30 determines a packet priority for the first packet 32-1 based at least in part on the contents of the first packet 32-1 (FIG. 3, block 2006). The deep packet inspector 30 generates an encapsulated packet 38-1 that comprises the first packet 32-1 and a priority indicator indicative of the packet priority without modifying the respective first packet 32-1 (FIG. 3, block 2008). The deep packet inspector 30 transmits the encapsulated packet 38-1 to the aggregation device 24 (FIG. 3, block 2010). The deep packet inspector 30 determines if there is another packet 32 for inspection (FIG. 3, block 2012). If so, the deep packet inspector 30 selects the next packet 32 and repeats the steps 2004-2010 discussed above (FIG. 3, blocks 2014, 2004-2010). If no packets 32 await inspection, the deep packet inspector 30 waits for additional packets from the distribution router 28.

Figure 4:
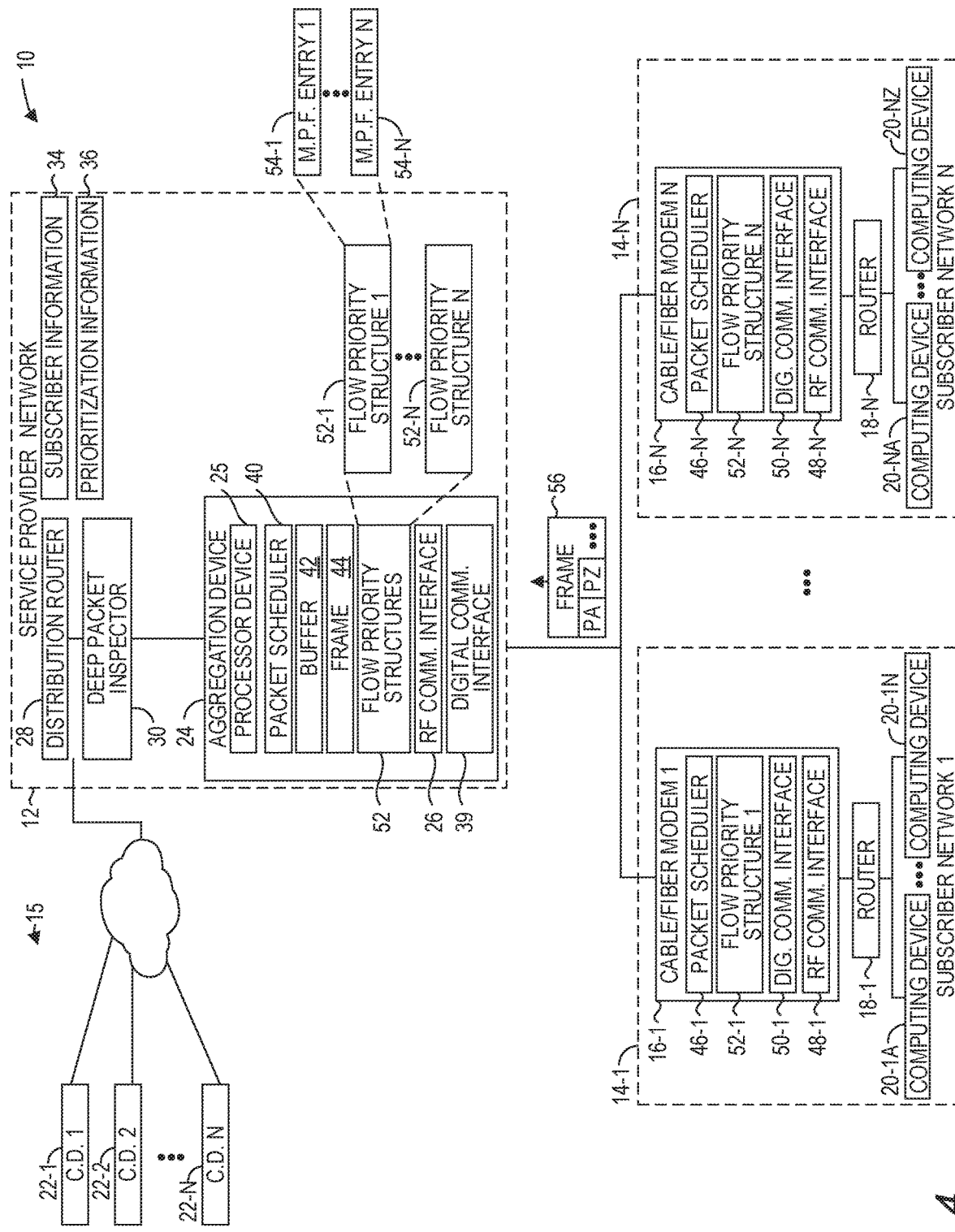
FIG. 4 is a block diagram of the system illustrated in FIG. 1 according to another embodiment.

FIG. 4 is a block diagram of the system 10 illustrated in FIG. 1 according to another embodiment. In this embodiment, the modem 16-1 of the subscriber network 14-1 includes a packet scheduler 46-1 for generating frames of data and communicating the frames of data to the aggregation device 24. The modem 16-1 also includes a first communication interface, in this example, an RF communication interface 48-1, via which the modem 16-1 communicates with the aggregation device 24. The modem 16-1 and the aggregation device 24 utilize a frame-based protocol, such as, by way of non-limiting example, the DOCSIS protocol, to communicate. The modem 16-1 also includes a digital communication interface 50-1 via which the modem 16-1 communicates with the router 18-1. The modem 16-1 may utilize any suitable protocol to communicate with the router 18-1, such as Ethernet, or the like. The subscriber network 14-N is similarly configured, and the modem 16-N includes a packet scheduler 46-N for generating frames of data and communicating the frames of data to the aggregation device 24, an RF communication interface 48-N, via which the modem 16-N communicates with the aggregation device 24, and a digital communication interface 50-N via which the modem 16-N communicates with the router 18-N.

In this embodiment, the deep packet inspector 30 may give the same priority indicator to each packet 32 of the same packet flow. In particular, each time the deep packet inspector 30 sees a packet 32 associated with a new flow, the deep packet inspector 30 inspects the packet 32, and based on the inspection as discussed above, determines a packet priority for the packet 32. Thereafter, the deep packet inspector 30 may simply give each packet 32 of the same flow the same packet priority. A packet flow may be identified by any desired criteria, but is typically a flow of packets communicated between the same two applications. In some embodiments, packet flows are identified by five pieces of information, such as source IP address, source port number, a protocol identifier, a destination IP address, and a destination port number. It is noted that, for a single packet flow, the source IP address, source port number, destination IP address, and destination port number are direction-oriented and that, in a reverse direction, the source IP address and port number become the destination IP address and port number, and vice-versa. However, even though the source and destination IP addresses and port numbers swap depending on direction, they identify the same packet flow between the same two applications.

The aggregation device 24 maintains a plurality of flow priority structures 52-1-52-N (generally, flow priority structures 52), each of which corresponds to one of the subscriber networks 14-1-14-N. The flow priority structures 52 maintain the packet priorities for the packet flows being handled by each of the modems 16-1-16-N. As an example, the flow priority structure 52-1 at a point in time contains a plurality of modem packet flow entries 54-1-54-N. Each of the modem packet flow entries 54-1-54-N comprises a modem packet flow identifier that identifies a particular packet flow being handled by the modem 16-1, and a corresponding packet flow priority indicator indicative of the packet priority given to that particular packet flow by the deep packet inspector 30. As an example, the modem packet flow entry 54-1 may identify a flow between a streaming video application executing on the computing device 20-1A and a streaming video service executing on the computing device 22-N. The modem packet flow entry 54-N may identify a flow between a VoIP application executing on the computing device 20-1N and a Voice over Internet Protocol (VoIP) service executing on the computing device 22-1.

The aggregation device 24 transmits the flow priority structure 52-1 to the modem 16-1 and the flow priority structure 52-N to the modem 16-N. The aggregation device 24 may send updated flow priority structures 52-1-52-N as new flows are generated, or may send flow priority structure updates that identify the new flow and the packet priority given to such flow by the deep packet inspector 30.

The modem 16-1 receives, via the digital interface 50-1, a plurality of packets originating from the computing devices 20-1A-20-1N, each packet corresponding to one of the packet flow priority indicators identified in the flow priority structure 52-1. The modem 16-1 generates a frame 56 that comprises a subset of packets selected from the plurality of packets based at least in part on the packet flow priority indicators that correspond to the plurality of packets. The modem 16-1 transmits the frame 56 via the RF communication interface 48-1 to the aggregation device 24. Note that the modem 16-1 does not include any packet flow priority indicators in the frame 56.

As discussed above with regard to the aggregation device 24, in some embodiments the modem 16-1 may store a plurality of packets received from the computing devices 20-1A-20-1N in a buffer, select the subset of packets from the buffer based at least in part on the packet flow priority indicators that correspond to the plurality of packets, and then delete the selected subset of packets from the buffer.

It is noted that because the packet scheduler 46-1 is a component of the modem 16-1, functionality implemented by the packet scheduler 46-1 may be attributed to the modem 16-1 generally. Moreover, in examples where the packet scheduler 46-1 comprises software instructions that program a processor device of the modem 16-1 to carry out functionality discussed herein, functionality implemented by the packet scheduler 46-1 may be attributed herein to such processor device.

Figure 5:
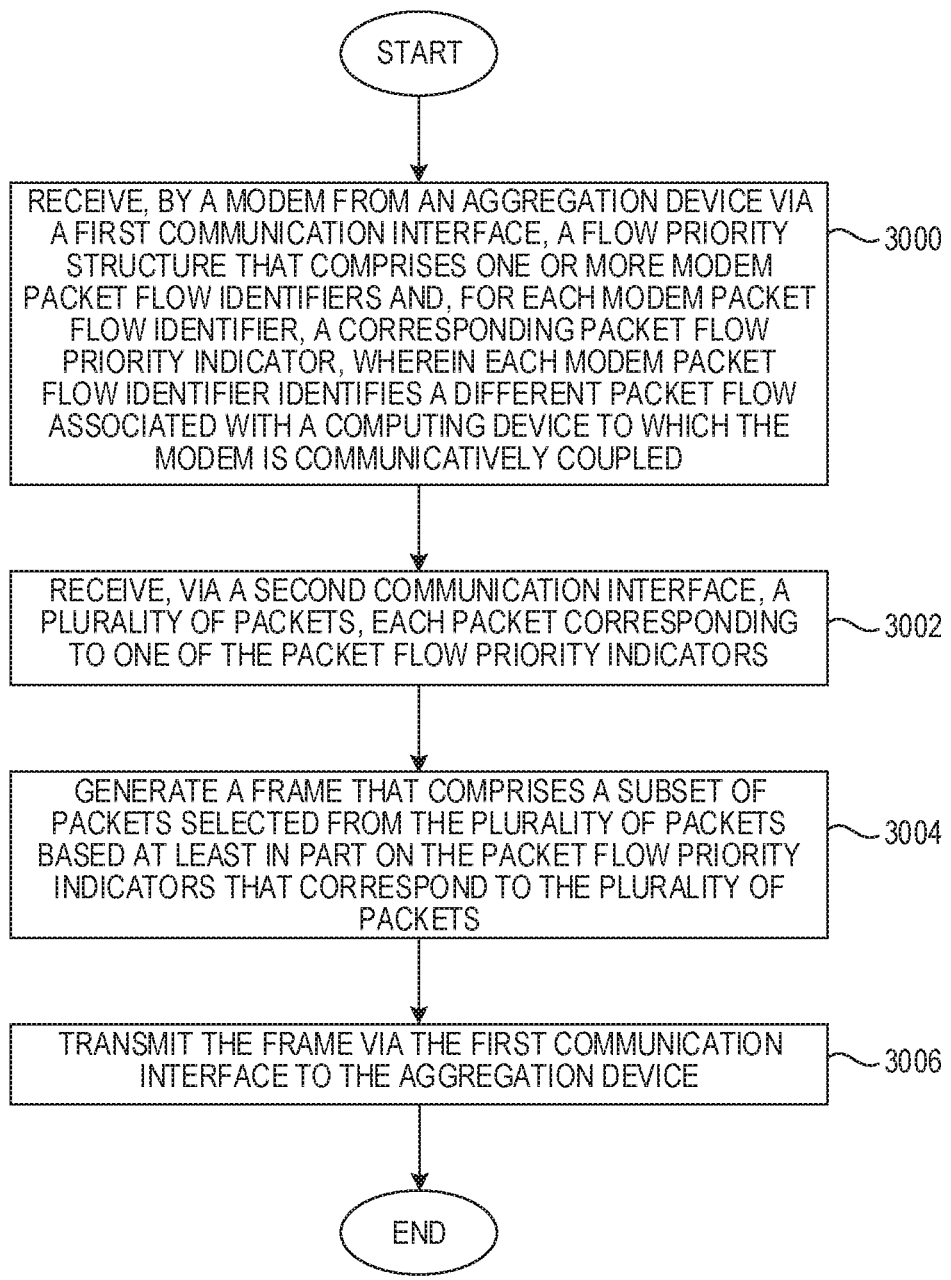
FIG. 5 is a flowchart of a method for modificationless packet prioritization for frame generation from the perspective of a modem, according to one embodiment.

FIG. 5 is a flowchart of a method for modificationless packet prioritization for frame generation from the perspective of a modem, according to one embodiment. FIG. 5 will be discussed in conjunction with FIG. 4. The modem 16-1 receives, via a first communication interface such as the RF communication interface 48-1, from the aggregation device 24, the flow priority structure 54-1 that comprises one or more modem packet flow identifiers, and for each modem packet flow identifier a corresponding packet flow priority indicator. Each modem packet flow identifier identifies a different packet flow associated with a computing device 20-1A-20-1N to which the modem 16-1 is communicatively coupled (FIG. 5, block 3000). The modem 16-1 receives, via a second communication interface such as the digital communication interface 50-1, a plurality of packets, each packet corresponding to one of the packet flow priority indicators (FIG. 5, block 3002). The modem 16-1 generates the frame 56 that comprises a subset of packets selected from the plurality of packets based at least in part on the packet flow priority indicators that correspond to the plurality of packets (FIG. 5, block 3004). The modem 16-1 transmits the frame 56 via the RF communication interface 48-1 to the aggregation device 24 (FIG. 5, block 3006).

Figure 6:
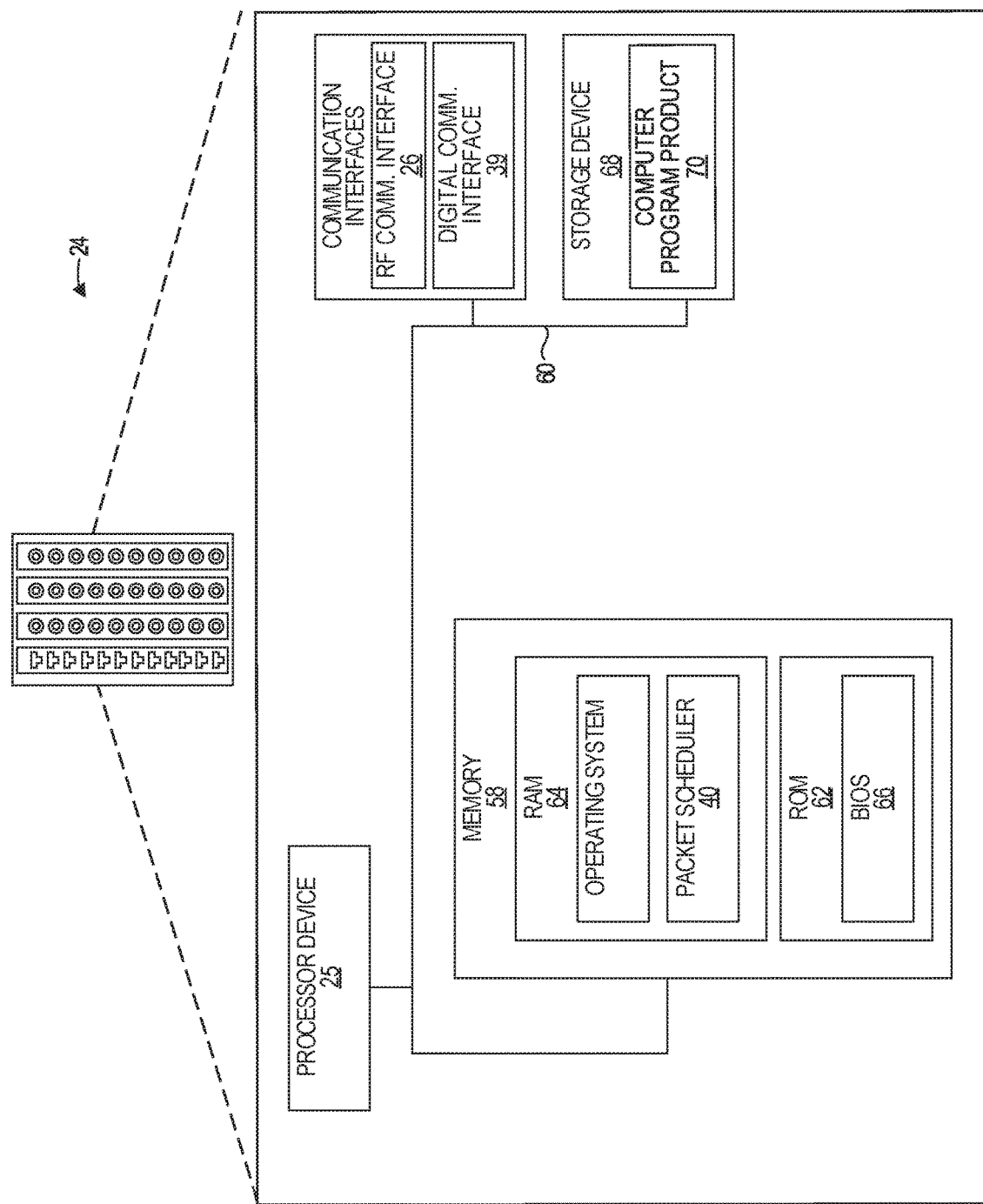
FIG. 6 is a block diagram of an aggregation device suitable for implementing embodiments disclosed herein.

FIG. 6 is a block diagram of the aggregation device 24 suitable for implementing embodiments disclosed herein. The aggregation device 24 may comprise any computing or electronic device capable of including firmware, hardware, and/or executing software instructions to implement the functionality described herein, such as a cable modem termination system, a fiber aggregation system, or the like. The aggregation device 24 includes the processor device 25, a system memory 58, and a system bus 60. The system bus 60 provides an interface for system components including, but not limited to, the system memory 58 and the processor device 25. The processor device 25 can be any commercially available or proprietary processor.

The system memory 58 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the aggregation device 24.

The aggregation device 24 may further include or be coupled to a non-transitory computer-readable storage medium such as a storage device 68, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 68 and other drives associated with computer-readable media and computer-usable media may provide non-volatile storage of data, data structures, computer-executable instructions, and the like.

A number of modules can be stored in the storage device 68 and in the volatile memory 64, including an operating system and one or more program modules, such as the packet scheduler 40, which may implement the functionality described herein in whole or in part.

All or a portion of the examples may be implemented as a computer program product 70 stored on a transitory or non-transitory computer-usable or computer-readable storage medium, such as the storage device 68, which includes complex programming instructions, such as complex computer-readable program code, to cause the processor device 25 to carry out the steps described herein.

The aggregation device 24 may also include a plurality of communication interfaces, such as one or more RF communication interfaces 26 which may comprise coaxial RF communication interfaces or any other suitable RF communication interface, and one or more digital communication interfaces 39 such as Ethernet communication interfaces or the like.

Figure 7:
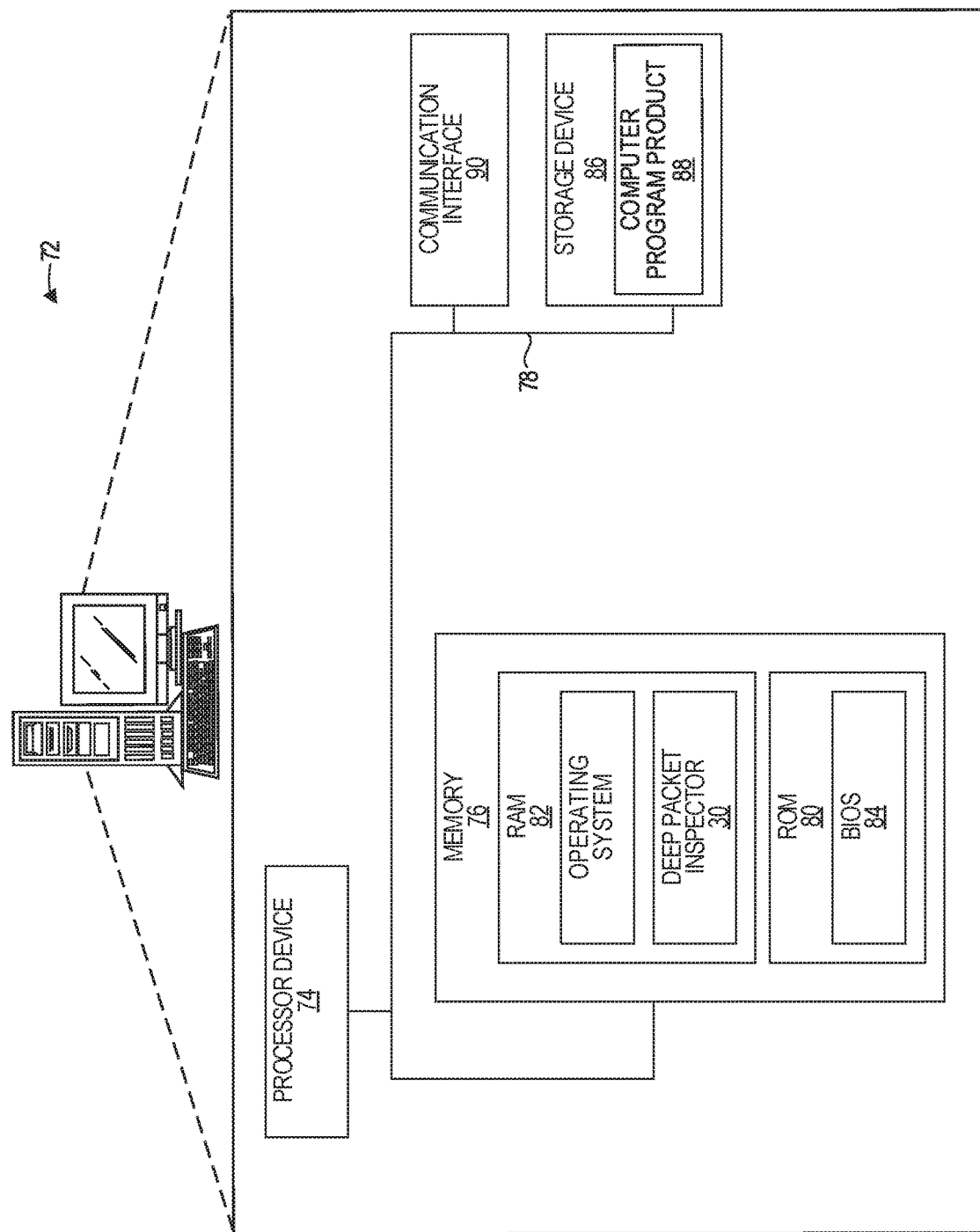
FIG. 7 is a block diagram of a computing device suitable for implementing a deep packet inspector according to one embodiment.

FIG. 7 is a block diagram of a computing device 72 suitable for implementing the deep packet inspector 30 according to one embodiment. The computing device 72 may comprise any computing or electronic device capable of including firmware, hardware, and/or executing software instructions to implement the functionality described herein, such as a server computing device, desktop computing device, or the like. The computing device 72 includes a processor device 74, a system memory 76, and a system bus 78. The system bus 78 provides an interface for system components including, but not limited to, the system memory 76 and the processor device 74. The processor device 74 can be any commercially available or proprietary processor.

The system memory 76 may include non-volatile memory 80 (e.g., ROM, EPROM, EEPROM, etc.), and volatile memory 82 (e.g., RAM). A BIOS 84 may be stored in the non-volatile memory 80 and can include the basic routines that help to transfer information between elements within the computing device 72.

The computing device 72 may further include or be coupled to a non-transitory computer-readable storage medium such as a storage device 86, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 86 and other drives associated with computer-readable media and computer-usable media may provide non-volatile storage of data, data structures, computer-executable instructions, and the like.

An executable deep packet inspector 30 can be stored in the storage device 86 as a computer program product 88, which may be initiated to be the executing deep packet inspector 30 in in the volatile memory 82.

The computing device 72 may also include one or more communication interfaces 90, such as Ethernet or the like, to communicate with other devices, such as, for example, the distribution router 28 and the aggregation device 24.

Figure 8:
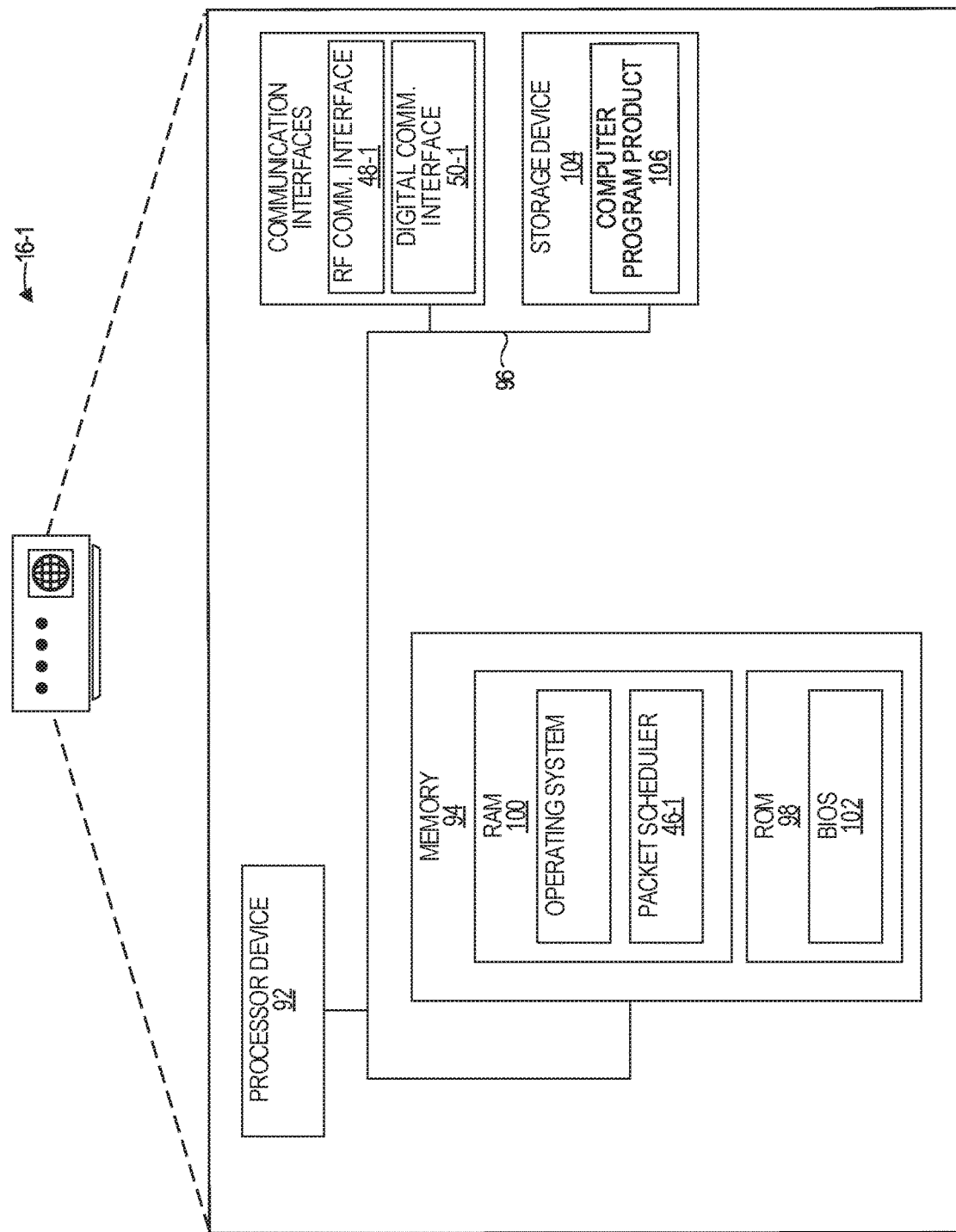
FIG. 8 is a block diagram of a modem suitable for implementing embodiments disclosed herein.

FIG. 8 is a block diagram of a modem, such as the modem 16-1, suitable for implementing embodiments disclosed herein. The modem 16-1 may comprise any computing or electronic device capable of including firmware, hardware, and/or executing software instructions to implement the functionality described herein, such as a cable modem, a fiber modem, a combination modem and router, or the like. The modem 16-1 includes a processor device 92, a system memory 94, and a system bus 96. The system bus 96 provides an interface for system components including, but not limited to, the system memory 94 and the processor device 92. The processor device 92 can be any commercially available or proprietary processor.

The system memory 94 may include non-volatile memory 98 (e.g., read-only memory (ROM), erasable programmable read-only memory (EPROM), electrically erasable programmable read-only memory (EEPROM), etc.), and volatile memory 100 (e.g., random-access memory (RAM)). A basic input/output system (BIOS) 102 may be stored in the non-volatile memory 98 and can include the basic routines that help to transfer information between elements within the modem 16-1.

The modem 16-1 may further include or be coupled to a non-transitory computer-readable storage medium such as a storage device 104, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 104 and other drives associated with computer-readable media and computer-usable media may provide non-volatile storage of data, data structures, computer-executable instructions, and the like.

A number of modules can be stored in the storage device 104 and in the volatile memory 100, including an operating system and one or more program modules, such as the packet scheduler 46-1 which may implement the functionality described herein in whole or in part.

All or a portion of the examples may be implemented as a computer program product 106 stored on a transitory or non-transitory computer-usable or computer-readable storage medium, such as the storage device 104, which includes complex programming instructions, such as complex computer-readable program code, to cause the processor device 92 to carry out the steps described herein.

The modem 16-1 may also include a plurality of communication interfaces, such as the RF communication interface 48-1, and one or more digital communication interfaces 50-1 such as Ethernet communication interfaces or the like.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
receiving, by an aggregation device, via a digital communication interface, a plurality of encapsulated packets, each respective encapsulated packet of the plurality of encapsulated packets comprising a priority indicator and a packet to which the priority indicator corresponds;
extracting a corresponding plurality of packets from the plurality of encapsulated packets;
generating a frame that comprises a subset of packets selected from the plurality of packets based at least in part on the priority indicators that correspond to the plurality of packets, wherein the frame does not include any priority indicators; and
transmitting the frame via a second communication interface.

2. The method of claim 1 wherein the second communication interface comprises a radio frequency (RF)-based communication interface.

3. The method of claim 2 wherein the RF-based communication interface comprises a coaxial cable RF-based communication interface.

4. The method of claim 1 wherein the digital communication interface comprises an Ethernet digital communication interface.

5. The method of claim 1 further comprising:
generating a first flow priority structure that corresponds to a first modem that is communicatively coupled to the second communication interface, the first flow priority structure comprising one or more first modem packet flow identifiers, and for each first modem packet flow identifier, a corresponding packet flow priority indicator, wherein each first modem packet flow identifier identifies a different packet flow associated with the first modem; and
transmitting the first flow priority structure via the second communication interface to the first modem.

6. The method of claim 5 further comprising:
generating a second flow priority structure that corresponds to a second modem that is communicatively coupled to the second communication interface, the second flow priority structure comprising one or more second modem packet flow identifiers, and for each second modem packet flow identifier, a corresponding packet flow priority indicator, wherein each second modem packet flow identifier identifies a different packet flow associated with the second modem; and
transmitting the second flow priority structure via the second communication interface to the second modem.

7. The method of claim 5 wherein each first modem packet flow identifier comprises a source internet protocol (IP) address, a source port number, a destination IP address, a destination port number, and a protocol identifier.

8. The method of claim 1 wherein the aggregation device comprises a cable modem termination system.

9. The method of claim 1 further comprising storing the plurality of packets in a buffer, and wherein generating the frame that comprises the subset of packets further comprises:
selecting the subset of packets from the buffer; and
deleting the subset of packets in the buffer.

10. The method of claim 1 wherein the second communication interface is communicatively coupled to a plurality of modems, each respective modem being configured to receive the frame from the aggregation device and determine if one or more packets in the frame are destined for the respective modem; and
wherein the frame comprises different packets destined for at least two different modems of the plurality of modems.

11. The method of claim 1 wherein the frame comprises a Data Over Cable Service Interface Specification (DOCSIS) frame.

12. The method of claim 1 further comprising:
receiving, by a deep packet inspector, the plurality of packets from a plurality of different computing devices destined for a plurality of different subscriber networks, the packets including packets that comprise voice over internet protocol (VoIP) packets and video packets; and
for each respective packet:
inspecting contents of the respective packet;

determining a packet priority for the respective packet based at least in part on the contents of the respective packet;

generating an encapsulated packet that comprises the respective packet and a priority indicator indicative of the packet priority without modifying the respective packet; and transmitting the encapsulated packet to the aggregation device.

13. The method of claim 12 wherein determining the packet priority for a first packet of the plurality of packets comprises:

determining a subscriber associated with the first packet;

accessing subscriber information to determine a subscriber priority associated with the subscriber; and determining the packet priority for the first packet based at least in part on the subscriber priority associated with the first packet.

14. The method of claim 12 wherein determining the packet priority for a first packet of the plurality of packets comprises:

determining a packet type associated with the first packet;

accessing service type priority information to determine a packet type priority associated with the first packet; and determining the packet priority for the first packet based at least in part on the packet type priority associated with the first packet.

15. The method of claim 12 further comprising using, by the deep packet inspector, one of Virtual Local Area Network (VLAN) and Virtual Extensible Local Area Network (VXLAN) encapsulation to encapsulate each packet of the plurality of packets.

16. A system comprising:

a deep packet inspector that is configured to:

receive a plurality of packets from a plurality of different computing devices destined for a plurality of different subscriber networks, the packets including packets that comprise voice over internet protocol (VoIP) packets and video packets; and for each respective packet:

inspect contents of the respective packet;

determine a packet priority for the respective packet based at least in part on the contents of the respective packet;

generate an encapsulated packet that comprises the respective packet and a priority indicator indicative of the packet priority without modifying the respective packet; and transmit the encapsulated packet to the aggregation device; and an aggregation device comprising:

a memory; and a processor device coupled to the memory, the processor device configured to:

receive, via a digital communication interface, the plurality of encapsulated packets from the deep packet inspector, each respective encapsulated packet of the plurality of encapsulated packets comprising a priority indicator and a packet to which the priority indicator corresponds;

extract a corresponding plurality of packets from the plurality of encapsulated packets;

generate a frame that comprises a subset of packets selected from the plurality of packets based at least in part on the priority indicators that correspond to the plurality of packets; and transmit the frame via a second communication interface.

17. The system of claim 16 wherein the second communication interface comprises a coaxial cable radio frequency-based communication interface.

18. An aggregation device comprising:

a memory; and a processor device coupled to the memory, the processor device configured to:

receive, via a digital communication interface, a plurality of encapsulated packets, each respective encapsulated packet of the plurality of encapsulated packets comprising a priority indicator and a packet to which the priority indicator corresponds;

extract a corresponding plurality of packets from the plurality of encapsulated packets;

generate a frame that comprises a subset of packets selected from the plurality of packets based at least in part on the priority indicators that correspond to the plurality of packets;

transmit the frame via a second communication interface;

generate a first flow priority structure that corresponds to a first modem that is communicatively coupled to the second communication interface, the first flow priority structure comprising one or more first modem packet flow identifiers, and for each first modem packet flow identifier, a corresponding packet flow priority indicator, wherein each first modem packet flow identifier identifies a different packet flow associated with the first modem; and transmit the first flow priority structure via the second communication interface to the first modem.

* * * * *